(12) United States Patent
Bernstein et al.

(10) Patent No.: US 7,284,200 B2
(45) Date of Patent: Oct. 16, 2007

(54) ORGANIZATION OF HANDWRITTEN NOTES USING HANDWRITTEN TITLES

(75) Inventors: Michael S. Bernstein, Seattle, WA (US); Vikram Madan, Bellevue, WA (US); Gregory H. Manto, Sammamish, WA (US); Gerhard A. Schobbe, Bellevue, WA (US); Shawna Swanson, Issaquah, WA (US); Kurt A. Geisel, Redmond, WA (US); Steve E. Weil, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 567 days.

(21) Appl. No.: 10/291,214

(22) Filed: Nov. 10, 2002

(65) Prior Publication Data
US 2004/0093565 A1    May 13, 2004

(51) Int. Cl.
*G06F 15/00* (2006.01)
(52) U.S. Cl. ................................... 715/541
(58) Field of Classification Search ............... 715/541, 715/500, 512; 382/186, 202
See application file for complete search history.

(56) References Cited

U.S. PATENT DOCUMENTS

| | | | | |
|---|---|---|---|---|
| 5,517,578 A | * | 5/1996 | Altman et al. | 382/181 |
| 5,546,538 A | * | 8/1996 | Cobbley et al. | 709/203 |
| 5,561,446 A | | 10/1996 | Montlick | |
| 5,594,640 A | * | 1/1997 | Capps et al. | 715/532 |
| 5,734,882 A | * | 3/1998 | Lopresti et al. | 707/200 |
| 5,784,504 A | * | 7/1998 | Anderson et al. | 382/309 |
| 5,799,315 A | * | 8/1998 | Rainey et al. | 707/102 |
| 5,832,474 A | * | 11/1998 | Lopresti et al. | 707/2 |
| 5,903,667 A | * | 5/1999 | Kuzunuki et al. | 382/187 |
| 5,953,734 A | * | 9/1999 | Tanaka | 715/541 |
| 5,991,440 A | * | 11/1999 | Matsubayashi et al. | 382/187 |
| 6,002,799 A | * | 12/1999 | Sklarew | 382/189 |
| 6,038,343 A | * | 3/2000 | Shimizu et al. | 382/187 |
| 6,130,962 A | * | 10/2000 | Sakurai | 382/190 |
| 6,345,119 B1 | * | 2/2002 | Hotta et al. | 382/225 |
| 6,389,434 B1 | * | 5/2002 | Rivette et al. | 715/512 |
| 6,389,435 B1 | * | 5/2002 | Golovchinsky et al. | 715/512 |
| 6,393,138 B1 | * | 5/2002 | Chai | 382/119 |
| 6,401,067 B2 | * | 6/2002 | Lewis et al. | 704/275 |
| 6,408,092 B1 | * | 6/2002 | Sites | 382/187 |
| 6,466,237 B1 | * | 10/2002 | Miyao et al. | 715/838 |
| 6,493,464 B1 | * | 12/2002 | Hawkins et al. | 382/189 |
| 6,509,912 B1 | | 1/2003 | Moran et al. | |

(Continued)

OTHER PUBLICATIONS

Spoerri, Souvenir: Flexible note-taking tool to pinpoint and share media in digital libraries, ACM Jul. 2002, p. 383.*

(Continued)

*Primary Examiner*—Cong-Lac Huynh
(74) *Attorney, Agent, or Firm*—Banner & Witcoff, Ltd.

(57) ABSTRACT

A system and method for associating an ink title with a note is described. A user may hand write a title for a document or note and have the handwritten ink title be displayed when interacting with the system when, for example, viewing the contents of a directory, reviewing the results of a search, viewing a list of most recently used documents, viewing a history of which documents were used, and the like. The use of a handwritten ink title speeds a user's recall of the content of the note over textual titles.

34 Claims, 11 Drawing Sheets

| Title | Folder | Date Mod. | Date Crea... | File Path |
|---|---|---|---|---|
| *Inventory Memo* | My Documents | 12/18/2002 | 12/15/2002 | My Documents\Inventory Memo |
| *Status Update* | My Documents | 5/13/2002 | 5/10/2002 | My Documents\Status Memo 1 |
| *Meeting Notes 9/22* | My Documents | 9/22/2002 | 9/22/2002 | My Documents\Notes 9_22 |
| *Meeting Notes 5/13* | My Documents | 4/7/2002 | 5/13/2001 | My Documents\Notes 5_13 |

U.S. PATENT DOCUMENTS

| | | | |
|---|---|---|---|
| 6,535,897 B1* | 3/2003 | Altman et al. | 715/541 |
| 6,565,611 B1* | 5/2003 | Wilcox et al. | 715/541 |
| 6,567,548 B2* | 5/2003 | Nathan et al. | 382/186 |
| 6,651,221 B1* | 11/2003 | Thompson et al. | 715/541 |
| 6,661,920 B1* | 12/2003 | Skinner | 382/187 |
| 6,674,900 B1* | 1/2004 | Ma et al. | 382/176 |
| 6,697,838 B1* | 2/2004 | Jakobson | 709/203 |
| 6,754,386 B1* | 6/2004 | Williamson et al. | 382/177 |
| 6,785,417 B1 | 8/2004 | Williamson et al. | |
| 6,798,907 B1* | 9/2004 | Clary et al. | 382/187 |
| 6,877,137 B1* | 4/2005 | Rivette et al. | 715/512 |
| 6,917,950 B2* | 7/2005 | Mcbride et al. | 707/203 |
| 6,937,214 B2* | 8/2005 | Chen et al. | 345/76 |
| 7,057,615 B2* | 6/2006 | Wang et al. | 345/442 |
| 7,120,872 B2* | 10/2006 | Thacker | 715/541 |
| 2002/0091548 A1* | 7/2002 | Auer et al. | 705/3 |
| 2003/0004991 A1* | 1/2003 | Keskar et al. | 707/512 |
| 2003/0101163 A1 | 5/2003 | Lui et al. | |
| 2003/0217336 A1* | 11/2003 | Gounares et al. | 715/541 |
| 2004/0017375 A1* | 1/2004 | Lui et al. | 345/581 |
| 2004/0083434 A1* | 4/2004 | Fitch | 715/541 |
| 2004/0093568 A1* | 5/2004 | Lerner et al. | 715/541 |
| 2004/0096105 A1* | 5/2004 | Holtsberg | 382/186 |
| 2004/0139391 A1* | 7/2004 | Stumbo et al. | 715/512 |
| 2005/0088464 A1* | 4/2005 | Bernstein | 347/5 |
| 2005/0114773 A1* | 5/2005 | Thacker | 715/541 |
| 2005/0125225 A1* | 6/2005 | Manu et al. | 704/237 |
| 2007/0053593 A1* | 3/2007 | Williamson et al. | 382/229 |

OTHER PUBLICATIONS

Golovchinsky et al., Moving Markup: Repositioning Freeform Annotations, ACM 2002, pp. 21-29.*

Aref et al., The Handwritten Trie: Indexing Electronic Ink, ACM 1995, pp. 151-162.*

U.S. Appl. No. 09/643,617, filed Aug. 22, 2000.

U.S. Appl. No. 10/177,480, filed Jun. 21, 2002.

Walid G. Aref et al., "On Handling Electronic Ink", ACM Computing Surveys, vol. 27, No. 4, Dec. 1995.

Walid Aref et al., "The Handwritten Trie: Indexing Electronic Ink", Matsushita Information Technology Laboratory, pp. 151-162, ACM 0-8971-731—Jun. 1995.

David Bargeron et al., "Reflowing Digital Ink Annotations", vol. 5, Issue No. 1, pp. 385-392, Apr. 5-10, 2003.

David Goldberg et al., "Stylus User Interfaces for Manipulating Text", UIST'91, pp. 127-135, Nov. 11-13, 1991.

Gene Golovchinsky et al., "Moving Markup: Repositioning Freeform Annotations", UIST'02, vol. 4, Issue 2, pp. 21-29, Oct. 27-30, 2002.

Takayuki Dan Kimura, "Potentials and Limitations of Pen-Based Computers", pp. 536-540.

Bartlett W. Mel et al., "Tablet: Personal Computer in the Year 2000", Communications of the ACM, vol. 31, No. 6, Jun. 1988.

Andrè Meyer, "Pen Computing", SIGCHI Bulletin, vol. 27, No. 3, Jul. 1995.

Morgan N. Price et al., "Linking By Inking: Trailblazing in a Paper-like Hypertext", ACM, pp. 30-39, 1998.

Bill N. Schilit et al., "Beyond Paper: Supporting Active Reading with Free Form Digital Ink Annotations", pp. 249-256, CHI 98, Apr. 18-23, 1998.

Lynn D. Wilcox et al., "Dynomite: A Dynamically Organized Ink and Audio Notebook", pp. 186-193, CHI 97, ACM, Mar. 22-27, 1997.

USPTO Office Action mailed Aug. 18, 2006, USSN 10690669.

* cited by examiner

Inventory Memo

| | |
|---|---|
| To: | Mr. Smith — 302, 309 |
| From: | Mr. Jones — 303 |
| Subject: | Inventory — 304 |
| CC: | — 305 |

It has come to my... — 306

301 (dashed box around header area)

307 Title: Inventory Memo
308 Document Contents:

| Title | Folder | Date Mod. | Date Crea... | File Path |
|---|---|---|---|---|
| *Inventory Memo* | My Documents | 12/18/2002 | 12/15/2002 | My Documents\Inventory Memo |
| *Status Update* | My Documents | 5/13/2002 | 5/10/2002 | My Documents\Status Memo 1 |
| *[signature] 9/22* | My Documents | 9/22/2002 | 9/22/2002 | My Documents\Notes 9_22 |
| *[signature] 5/13* | My Documents | 4/7/2002 | 5/13/2001 | My Documents\Notes 5_13 |

ORGANIZATION OF HANDWRITTEN NOTES USING HANDWRITTEN TITLES

TECHNICAL FIELD

Aspects of the present invention relate to the capture and display of information. More particularly, aspects of the present invention relate to capturing a handwritten title for a document and later displaying the handwritten title.

BACKGROUND

Typical computer systems, especially computer systems using graphical user interface (GUI) systems, such as Microsoft WINDOWS, are optimized for accepting user input from one or more discrete input devices such as a keyboard for entering text, and a pointing device such as a mouse with one or more buttons for driving the user interface.

Some computing systems have expanded the input and interaction systems available to a user by allowing the use of a stylus to input information into the systems. The stylus may take the place of both the keyboard (for data entry) as well as the mouse (for control). Some computing systems receive handwritten electronic information or electronic ink and immediately attempt to convert the electronic ink into text. Other systems permit the electronic ink to remain in the handwritten form.

Figure 12:
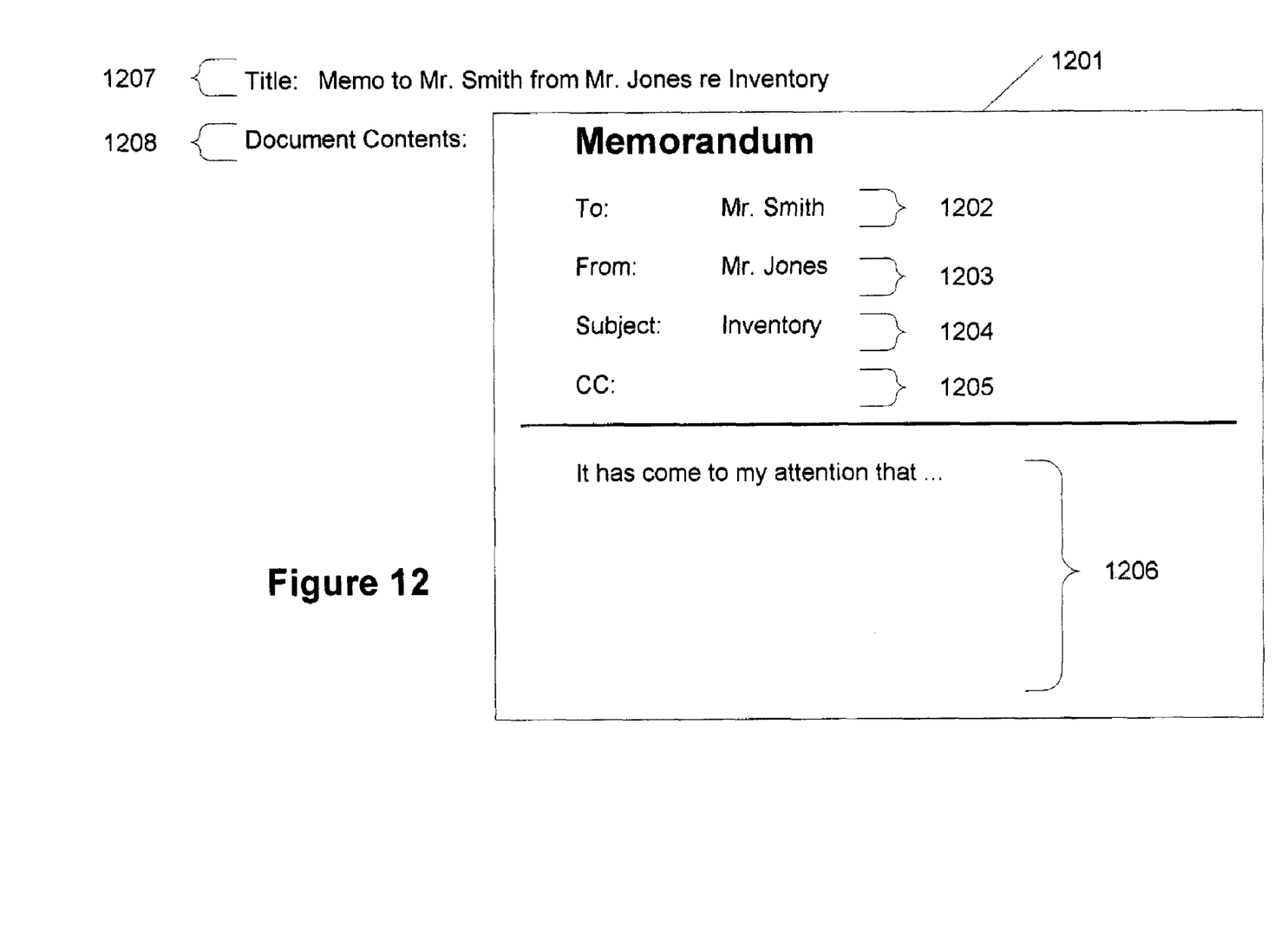
FIG. 12 shows a conventional textual note with a conventional textual title.

Electronic ink allows users to easily create and store handwritten notes. Handwritten notes may take a variety of forms including free form notes, maps, sketches, memorandums, to-do lists, and others. FIG. 12 shows a conventional note 1201 in which all information was typed into the system. The note 1201 includes a variety of regions including a "to" region 1202, a "from" region 1203, a "subject" region 1204, a "CC:" region 1205, and content 1206. This information may be generally referred to as document contents 1208. Finally, textual title 1207 identifies the note 1201.

While textual titles on notes are useful, issues arise when using a stylus-based input system. Because of the speed of creating notes and ability to have minimal limitations on the content of the notes, identifying the notes without some sort of identifier is troublesome for notes created using a stylus.

To address this issue, notes may be stored with the stored file identified by a textual title. The title generally includes some sort of meta-data that relates to the note's content, user, time of creation, and the like. However, textual titles suffer at least two drawbacks. First, textual title information may be difficult or involve multiple steps to create the title including touch-typing a displayed keyboard or handwriting ink then converting the ink into a textual title by handwriting recognition. Second, textual titles are prone to error because of the process by which they are entered as set forth above in a stylus-based input system. To correct this error, one then needs to spend even more time to correct a title of a note.

A further issue includes the concern of subsequent retrieval of the saved notes. Here, the user is required to remember and correlate the note with title, a particularly hard task when note titles contain handwriting recognition errors. Given that most human beings can quickly process a lot of visually rich information, a better system of organizing handwritten notes is needed. While some systems may use thumbnails to display the contents of a page, these thumbnails are not directly transferable to notes because thumbnails involve compressing a page down to a small size, thereby making handwritten ink illegible or otherwise useless for identification purposes. A system is needed that provides a way of organizing handwritten notes, permitting users to easily remember the content.

SUMMARY

The aspects of the present invention address one or more of the issues described above, thereby providing an easy way for users to recognize their handwritten notes. In some embodiments, the handwritten ink titles may be associated with the stored version of a handwritten note. In other embodiments, the handwritten ink titles may be extracted from content of a handwritten note. Further, aspects of the invention relate to various capturing techniques and displaying techniques for working with handwritten ink titles.

These and other aspects are addressed in relation to the Figures and related description.

BRIEF DESCRIPTION OF DRAWINGS

The foregoing summary of aspects of the invention, as well as the following detailed description of various embodiments, is better understood when read in conjunction with the accompanying drawings, which are included by way of example, and not by way of limitation with regard to the claimed invention.

DETAILED DESCRIPTION OF DRAWINGS

Aspects of the present invention relate to creating and displaying handwritten ink titles to be associated with notes. The notes may be handwritten notes or may include non-handwritten notes (including images, textual information, and the like). To assist the user, the following is arranged with the following subheadings: characteristics of ink; terms; general-purpose computer; ink titles; capture and display of ink titles; capturing ink titles; and displaying ink titles.

Characteristics of Ink

Electronic ink (or ink) refers to a sequence of strokes, where each stroke is comprised of a sequence of points. The points may be represented using a variety of known techniques including Cartesian coordinates (X, Y), polar coordinates (r, Θ), and other techniques as known in the art.

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve).

To provide the look and feel of physical ink, electronic ink may additionally store ink strokes and properties associated with the ink strokes to more fully render ink. Ink may be stored as a series of strokes and a series of properties. In other situations, ink may be stored with a complex series of properties in which the properties have properties of their own. Properties of the ink may include, for example, color, width, pressure between the stylus and tablet, and angle between the stylus and tablet, and pen shape and the like. While these properties may suffice for many applications, electronic ink is extensible to include custom properties (and other data) generated by additional applications. All strokes and values may be stored directly with excess information. However, alternative versions of ink reflect considerations that eliminate excess information when possible or practicable so as to minimize the physical size of the stored ink.

The properties used to define an ink object and the strokes within the ink object may have varying scope. For example, some properties may apply to all ink strokes in an ink object (e.g., the shape of a pen tip). Other properties may relate only to a specific point (e.g., a point at which a stylus starts a stroke). Others may relate to specific strokes while others may relate to packets of information as reported by hardware (e.g., coordinates, pressure, angle of pen, the intervals of time between reported coordinates, and the like). In short, properties have different levels of scope.

To efficiently store properties, some may be explicitly specified while others may be implicit. In a simple example, all properties may be default properties and not specified in an ink object. So, the ink object may only have X and Y coordinate values. In another example, the ink object may have properties that affect the entire ink object but the properties are specified in the ink object. In a third example, some strokes may have a first set of properties and others have a second set of properties. The properties may be defined initially at the beginning of the ink object and the individual strokes may reference the previously defined properties as needed. Using this approach of defining properties then later referencing the properties promotes a greater efficiency in storing properties. This becomes more apparent as an ink object becomes larger as the number of properties increases and the number of ink strokes referencing the properties increases.

Terms

Ink—A sequence or set of strokes with properties. A sequence of strokes may include strokes in an ordered form. The sequence may be ordered by the time captured or by where the strokes appear on a page. Other orders are possible. A set of strokes may includes sequences of strokes or unordered strokes or any combination thereof.

Ink object—A data structure storing ink with or without properties.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, the points may be defined relative to a capturing space (for example, points on a digitizer), a virtual ink space (the coordinates in a space into which captured ink is placed), and/or display space (the points or pixels of a display device).

General-Purpose Computer

Figure 1:
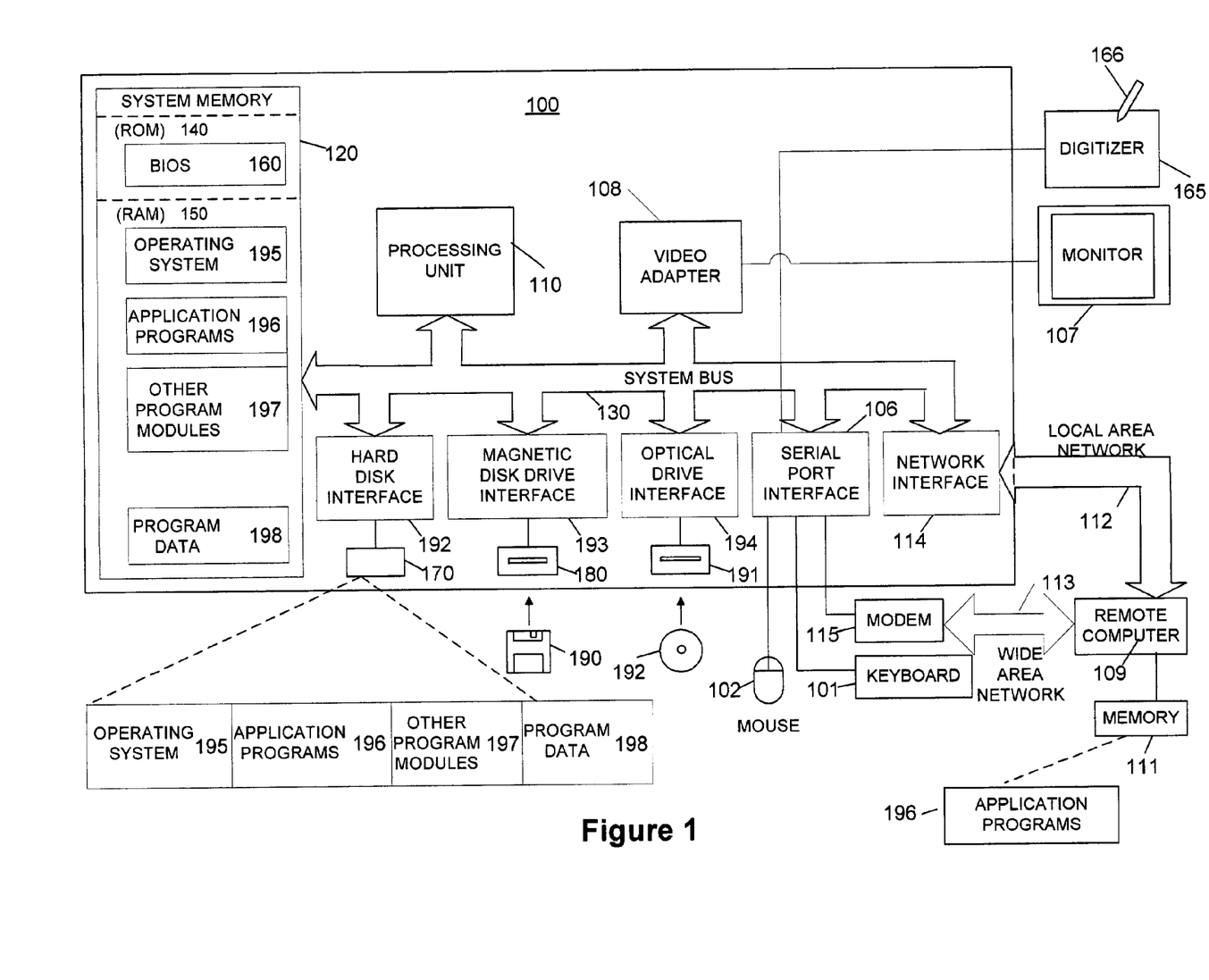
FIG. 1 shows a general-purpose computer supporting one or more aspects of the present invention.

FIG. 1 illustrates a schematic diagram of an illustrative conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150. While FIG. 1 shows a general purpose computer, the identification of the general purpose computer encompasses desktop computers, notebook computers, personal data assistants (PDAs), and telephones with an interactive display.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a one embodiment, a pen digitizer 165 and accompanying pen or stylus 166 are provided in order to digitally capture freehand input. Although a direct connection between the pen digitizer 165 and the serial port interface 106 is shown, in practice, the pen digitizer 165 may be coupled to the processing unit 110 directly, parallel port or other interface and the system bus 130 as known in the art. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device. The connection may be wired or wireless (including such standards such as IEEE 802.11x, Bluetooth, and the like).

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
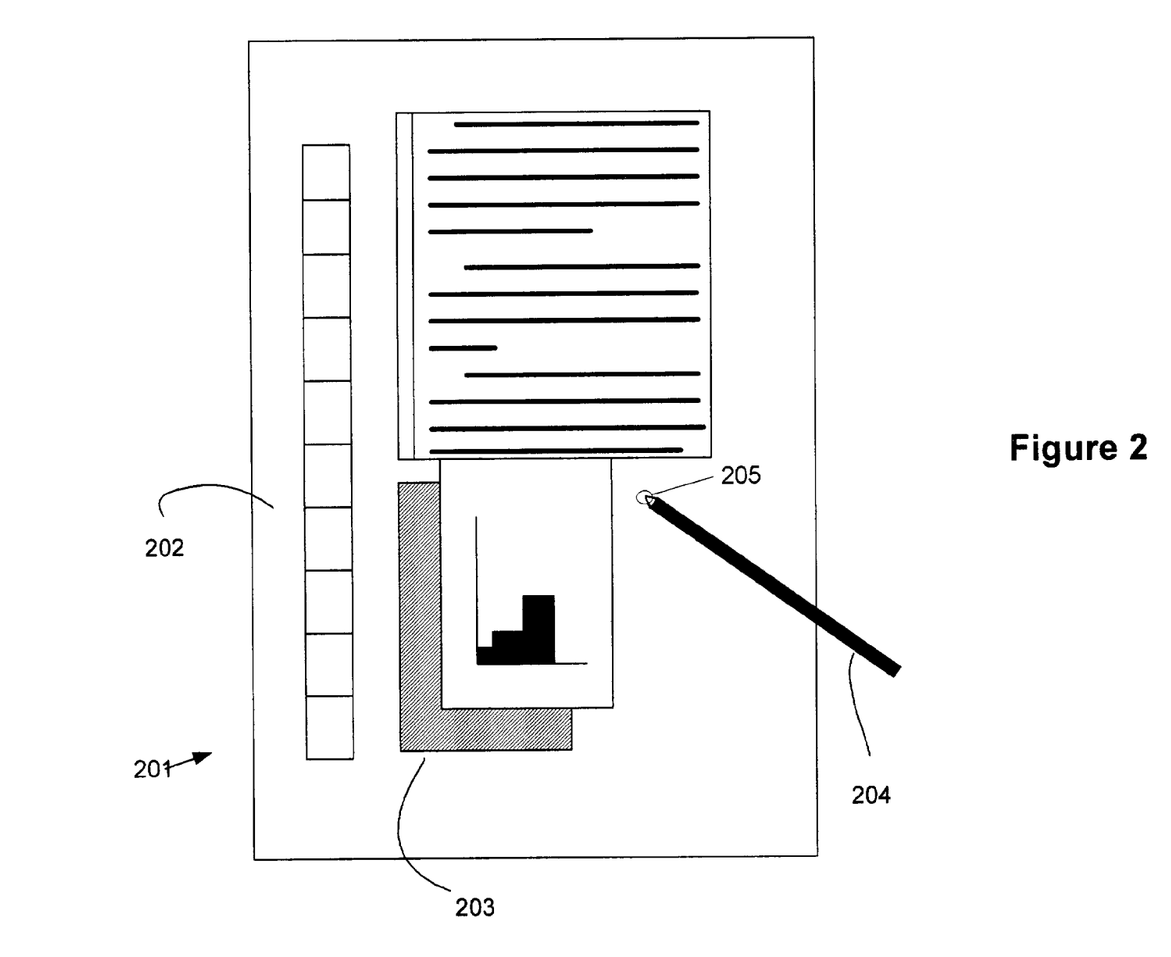
FIG. 2 shows a display for a stylus-based input system according to aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, in one example, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 has contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Ink Titles

Figure 3:
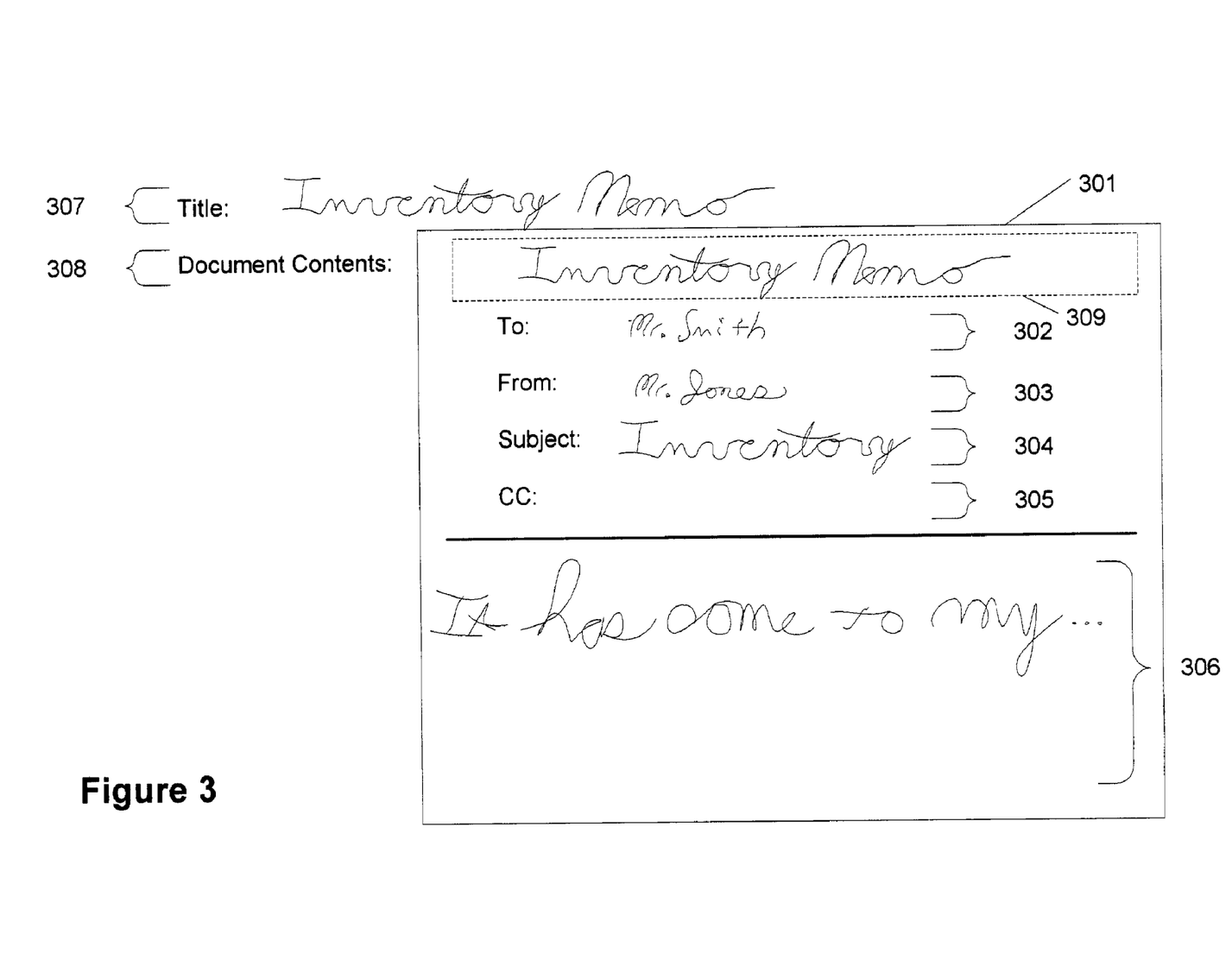
FIGS. 3 through 5 show various embodiments of handwritten ink titles for handwritten notes according to aspects of the present invention.

FIG. 3 shows a handwritten note 301. In this and following examples, a memorandum format is used for the handwritten note 301. Of course, other document forms may be used other than a memorandum. The other forms may include journal entries, annotations, comments, sketches, drawings, and other combinations. Other formats are possible.

Handwritten note 301 includes a variety of different sections. Section 302 relates to the person to whom the memo is addressed. Section 303 relates to the person sending the memo. Section 304 relates to the subject of the memo. Section 305 relates to any CC:'s of the memo. Finally, section 306 relates to the content of the memo.

Two additional areas may be related to note 301. First, title section 307 contains a title of handwritten note 301. Second, document contents section 308 relates to the content shown in handwritten note 301. Here, a handwritten ink title was entered into handwritten ink title section 309. The captured ink contents from section 309 may be used to provide the handwritten ink title in section 307.

One of the benefits of using ink titles as opposed to textual titles is the ability of users to recognize their own handwriting. The recognition time may be very quick. The recognition may be made faster especially when the ink title is combined with other embellishments (including, for example, the use of colors, symbols, glyphs, borders, and the like) that the user added to help distinguish the title.

A further aspect of ink titles is the personalization of the files. By the fact that the user may add a personal (and personalized) title enhances the user's perception that the handwritten files are uniquely his or her own.

Figure 4:
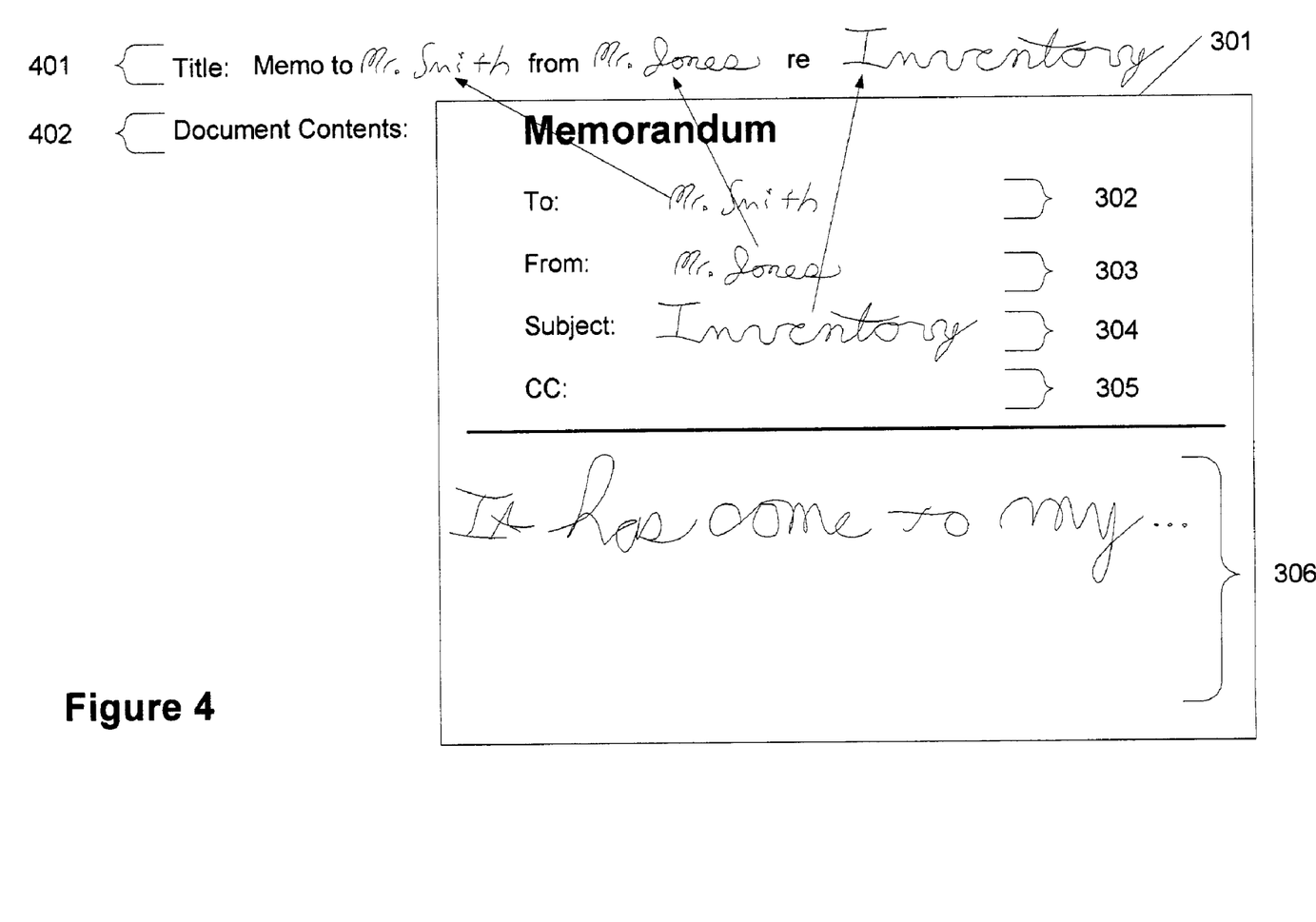

FIG. 4 shows a handwritten note 301, similar to that shown in FIG. 3. FIG. 4 shows ink title section 401 and document contents section 402. Here, the title section 401 includes information drawn from the content of the note as well as the structure of the note. The title 401, which reads "memo to Mr. Smith from Mr. Jones re inventory," is derived from at least one of the structure of the note 301, the content of the note 301, or any additional information (for example date and time created and/or modified). As shown in FIG. 4, some of the handwritten ink has been used to create the title of section 401. In this example, the contents of the "to" field 302, the "from" field 303, and the "subject" field 304 have been used with their relevant location information to create the ink title of section 401. It is appreciated that in some cases handwritten notes do not have structure. In those situations, or where one desires in other situations, the title of the note may be derived from the content of the note. For example, the first line of the note may be used to form the title. Alternatively, other sections of the note may be used to form the title. For example, linguistic analysis may be used to determine the most important words in the note 301, the words in the largest print, the first sentence, proper names, and the like.

Figure 5:
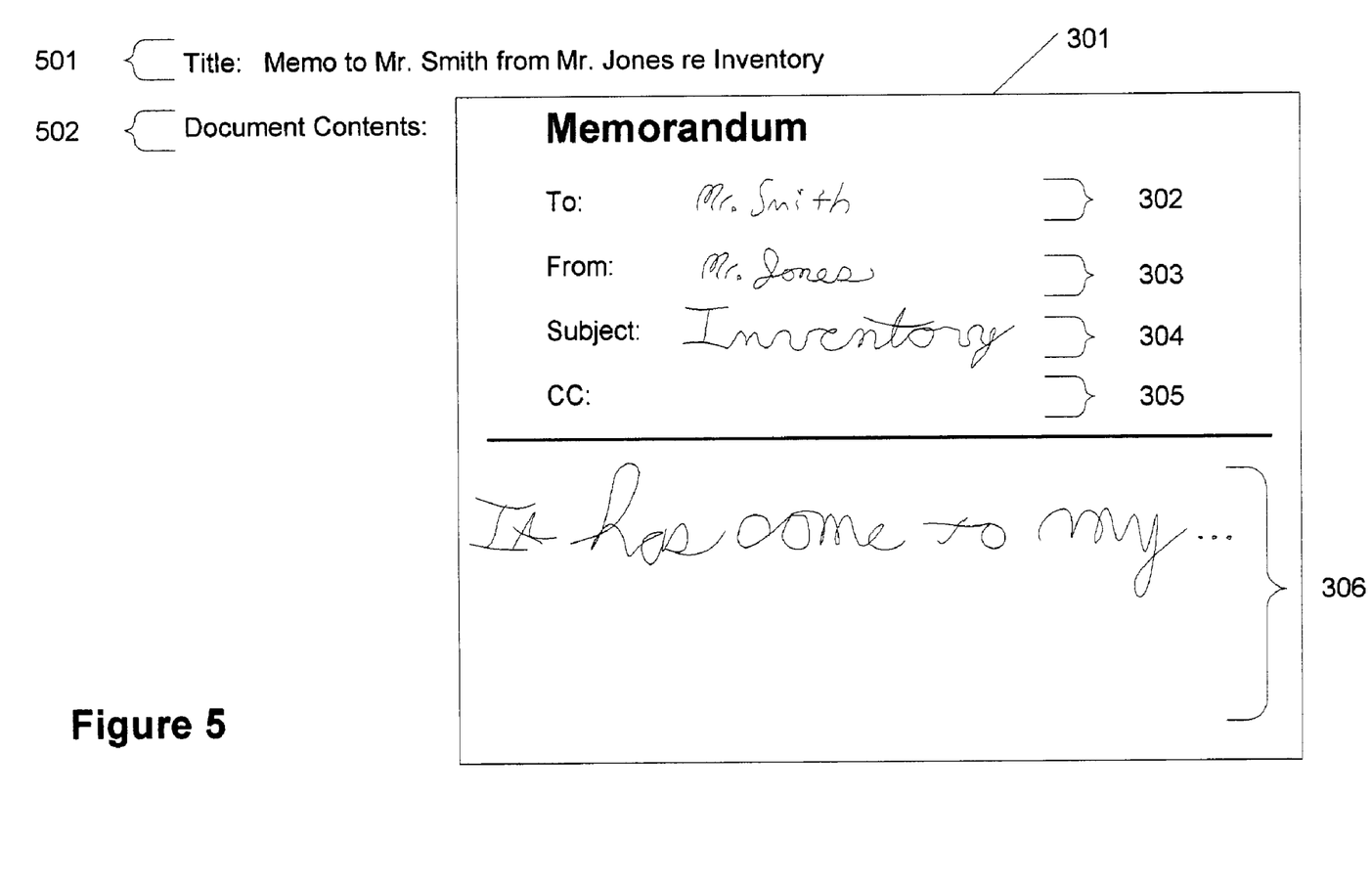

FIG. 5 shows ink note 301 with title section 501 and document content section 502. Ink title section 501 includes a text title. The text title as shown in title section 501 may originate from the user typing in the text title, handwriting the title in ink and ink being converted to text, or the title may be derived from the content of ink note 301.

Figure 6:
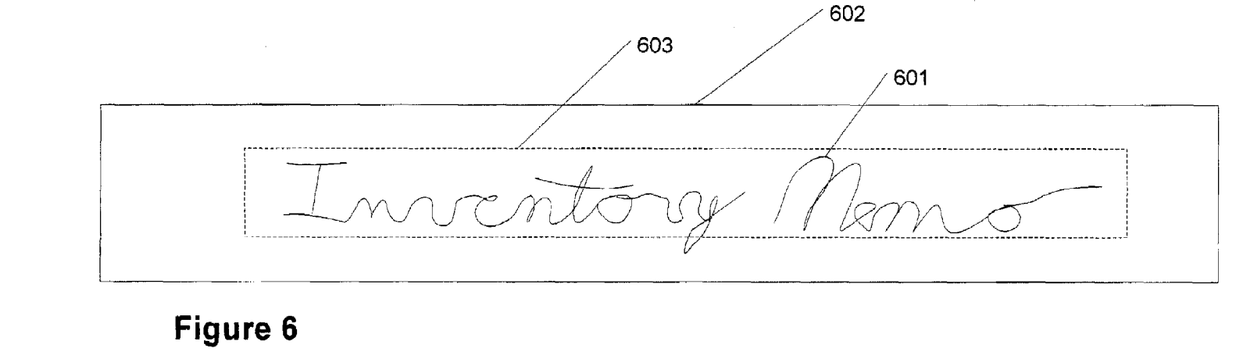
FIG. 6 shows a region for capturing an ink title in accordance with embodiments of the present invention.

FIG. 6 shows a region capturing an ink title. The user writes an ink title 601 in ink title area 602. The entire ink title area 602 may be used to represent and frame ink title 601. Alternatively, one may use a bounding box to minimize any unused space. Bounding box (which may be a rectangle or any other shape) 603 may conform to the shape ink title 601. One may crop tightly to the bounding box or may crop loosely. Further, the cropping may vary (in cropping tightness) if ink extends outside the ink title area 601 to include or reject some of the ink.

Figure 7:
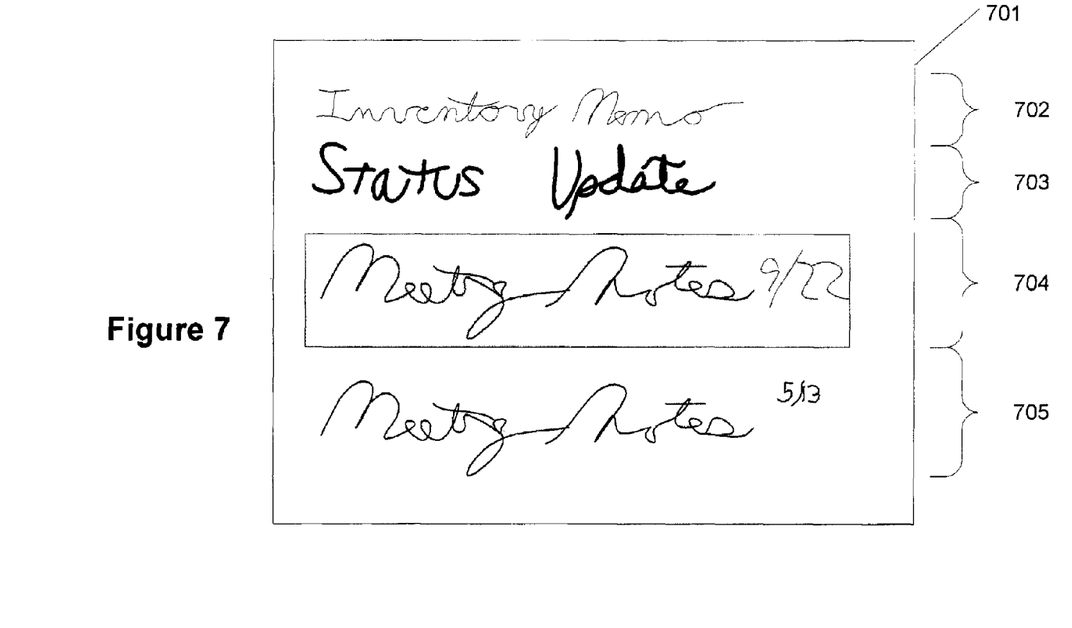
FIGS. 7 and 8 show displays of ink titles in accordance with embodiments of the present invention.

FIG. 7 shows a list of ink titles in various formats. Display list 701 of ink titles may be shown to a user in various situations. For example, a user may wish to see his most recently used documents. Alternatively, a user may wish to receive the contents of a directory or some other list. In these and other examples, display list 701 may be provided to the user. The providing of the users with handwritten ink titles spurs one's recognition of the contents faster than seeing a textual title. Other benefits include 1) recognition is not required (improving performance and/or eliminating user distraction as users tend to correct textual errors when displayed), 2) permitting the use of text variations that may not translate accurately to text (for example, size and color and the like), and 3) permitting the use of symbols or decorations (for example, circling, highlighting, arrows or connecting lines) that are not expressible in text.

Display list 701 includes a variety of different ways of displaying ink titles. These titles may be as captured in title region 602 or may have been subsequently modified to show additional formatting. For example, the first title 702 includes the title "inventory memo" in a normal pen width. The second title 703 includes the title "status update" in a larger or bold pen width. The third title 704 includes the title "meeting notes 9/22" in a normal pen width but with a highlighted background. The fourth title 705 includes the title "meeting notes 5/13" in a normal pen width but where the "5/13" is superscripted. From these examples, one can capture and/or modify ink titles to be highlighted in various ways.

Figure 8:
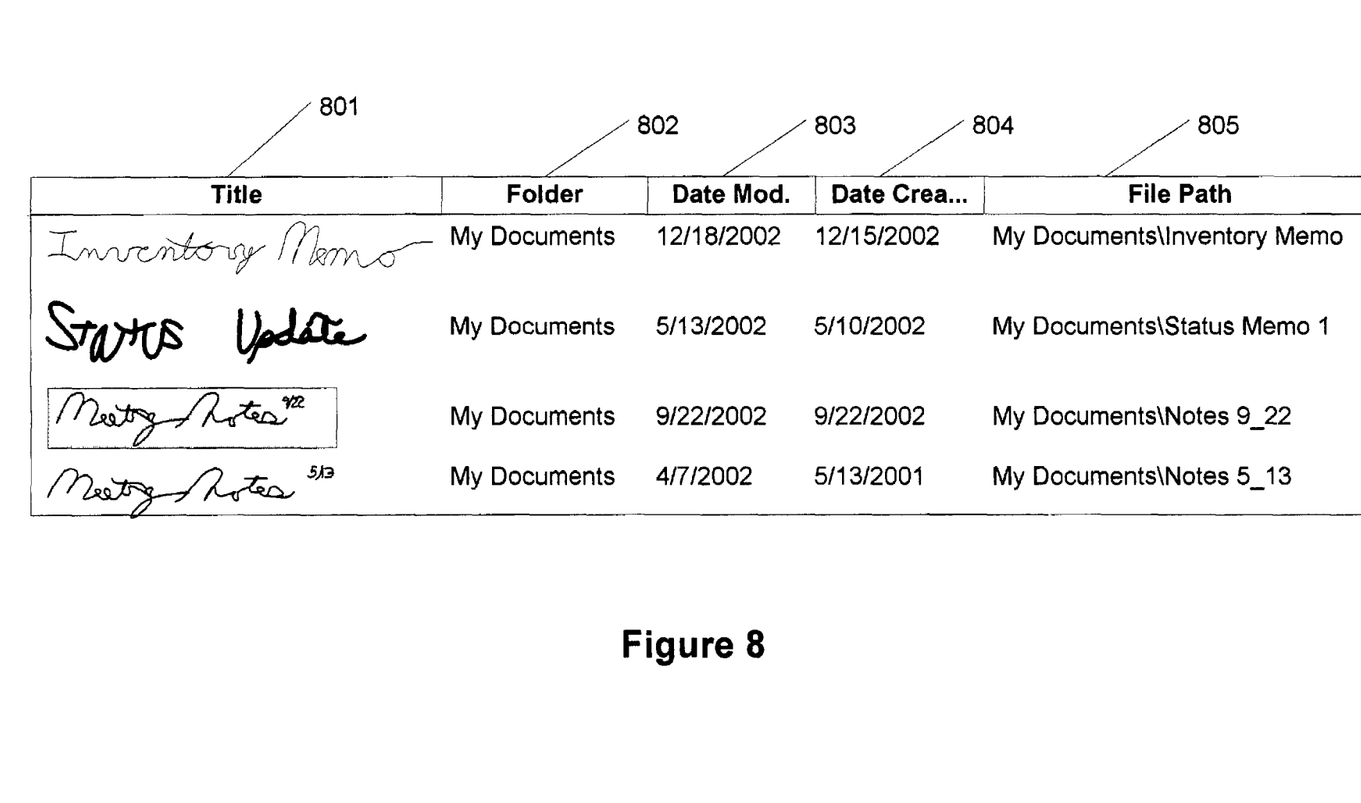

FIG. 8 shows a listing of a directory's contents of various notes. The title of the notes is provided in column 801. The folder is in column 802. The date modified is provided in column 803. The date created is provided in column 804. Path of the file is shown in column 805. The columns shown are for illustrative purposes only. Other columns regarding other properties may be used as are known in the art. Notably, there may be a correspondence between the title 801 of a document and its filename as shown in the file path column 805. For example, the first file entitled "inventory memo" has the name "inventory memo" as its file name. Alternatively, a different title may be used, which is different from the ink title of a document. For example, the second document is entitled "status update" yet bears the filename of "status memo 1." Also, the third and fourth ink titles (entitled "meeting notes 9/22" and "meeting notes 5/13") have file names of "notes 9_22" and "notes 5_13".

Capture and Display of Ink Titles

Figure 9:
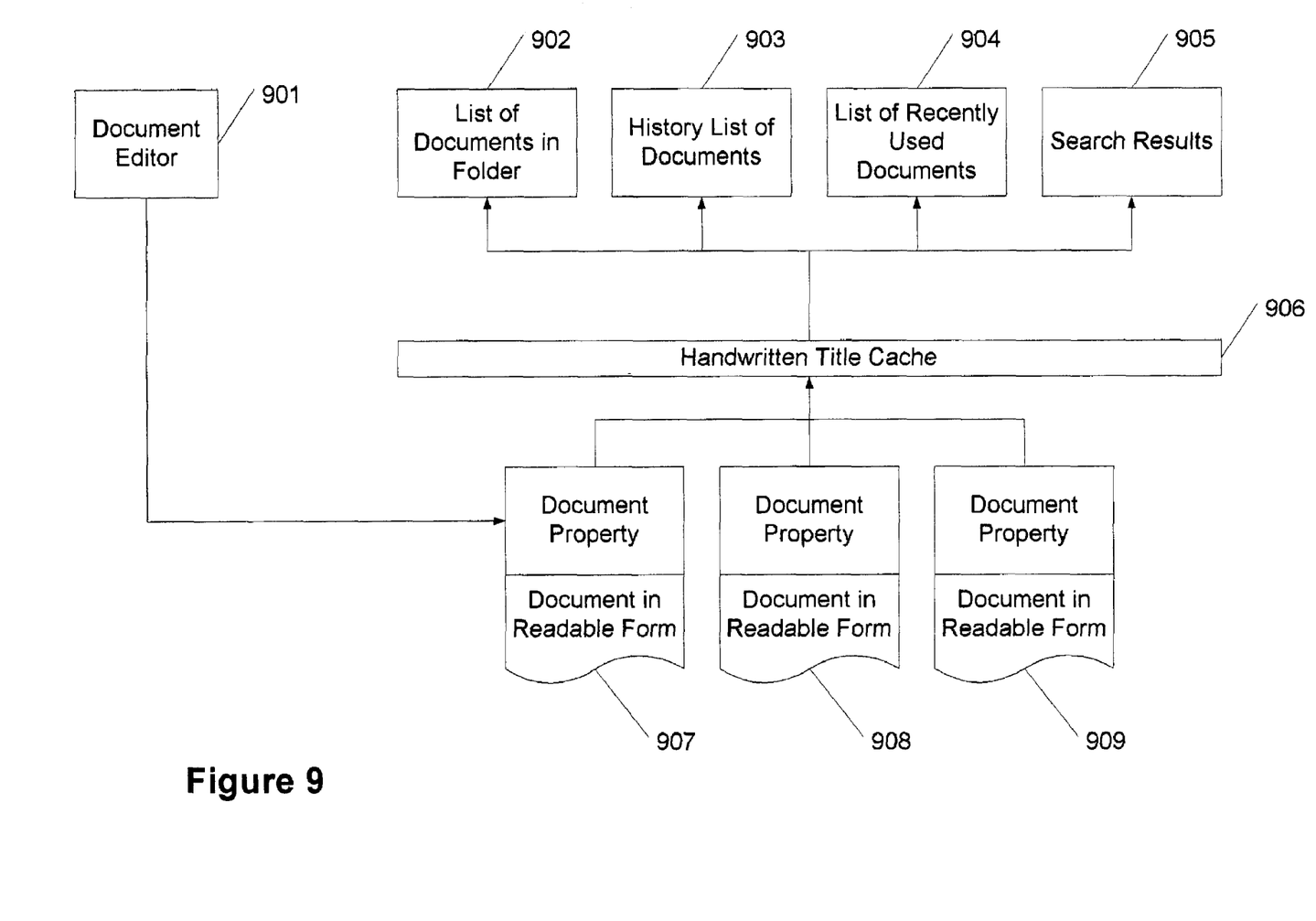
FIG. 9 shows a path for ink titles in accordance with embodiments of the present invention.

FIG. 9 shows an example of how ink titles may be captured and displayed. It is appreciated that all notes do not always have titles. A document editor 901 creates or modifies a document. The ink title for the document may be entered separately, entered with the document, or may be extracted from the content in the document. The ink title is transferred from the document editor 901 and included as a document property in documents 907-909. The handwritten ink title from document editor 901 may then be forwarded to a handwritten ink title cache 906. The information from the handwritten ink title cache 906 may be forwarded as needed to a list of documents in a folder 902, a history list of documents 903, a list of recently used documents 904, and search results 905. Here, the title may be part of the document or may be stored separately from the document. One of the benefits of storing the title with the document is the shorter opening time of the document in that it would have been already opened to obtain the title. On the other hand, one of the benefits of storing the title apart from the note is the shorter load time of the title (when only the title, not the entire document, was needed) and minimizing system resource consumption.

The title may be represented in a number of forms. For example, the title may be represented as an image file (for example, a bitmap file or other graphical format). The title may be in a special format for ink (for example, serially storing the ink with property and stroke information). These two may be combined for robust handling of ink. For example, the title may be stored as an image file with the special format for ink placed in the comment field of the image file. In this example, a non-ink-enabled system can use the graphical image. An ink-enabled system may ignore the image file and display the ink using the special format for ink. The benefits of using a string assigned to a file include the user being insulated from having to know what image is assigned to which file. This association may be done apart from the user.

One may search for documents based on the ink titles. The searching may be an ink-to-ink search in which the search procedure attempts to match one or more ink strokes in a search phrase to an ink title. Alternatively, the system may store ink titles with a text equivalent and attempt to search based on a converted-to-text search phrase. Because of the possibility for errors, the searching process may be searching not only the results of the ink-to-text conversion but also possible alternatives of the converted ink. For example, an ink title of "meeting notes" may have alternative textual representations stored as "meeting votes," "meet in notes," "meat in notes." The search phrase may also be searched with alternatives as well. The contents of U.S. Ser. No. 09/643,617, filed Aug. 22, 2000, entitled "Method and System for Searching Word in Ink Word Documents," to Peter Williamson and Charlton Lui and U.S. Ser. No.

10/177,480, filed Jun. 21, 2002, entitled "Method and System for Searching Words and Phrases in Active and Stored Ink Word Documents," to Charlton Lui, Gregory Manto, Vikram Madan, Ryan Cukierman, and Jon Clark, are expressly incorporated herein by reference for material relating to the searching associated with ink.

In another aspect of the invention, the textual representation of an ink title may be used for other purposes. For example, one may sort the list of titles in either of FIGS. 7 and 8 by the textual representations of the ink titles.

Other aspects include expanding the displayed note title to display the entire ink note when an input or control device is hovered over the title. This provides the ability for the user to quickly see the contents of a note without having to separately open then close the note.

Capturing Ink Titles

Figure 10:
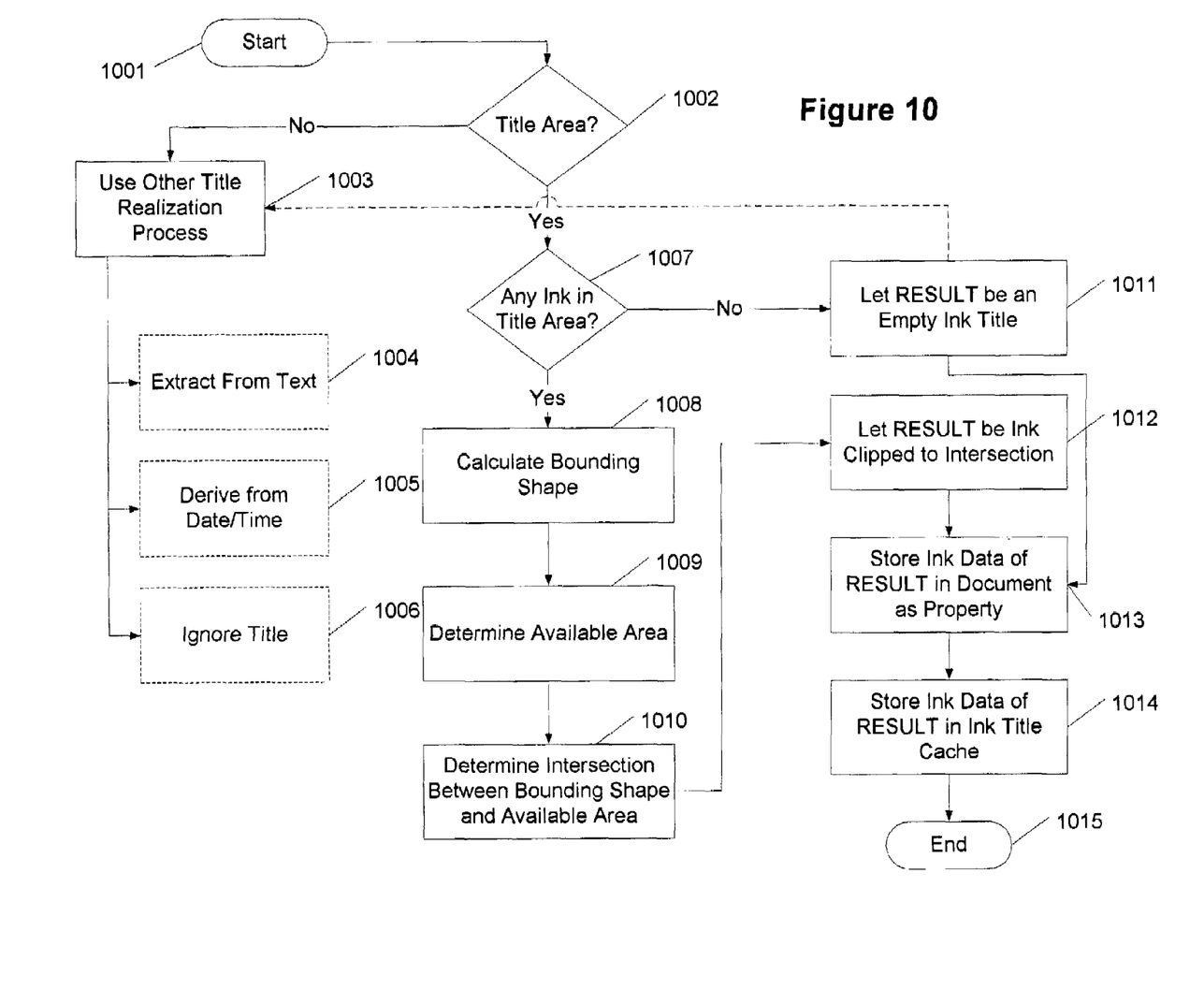
FIG. 10 shows a process for capturing ink titles in accordance with embodiments of the present invention.

Each document or note in document editor 901 may have an initial area that may be referred to as an ink title area, such that ink placed in the ink title area is considered part of the title. When the document is saved or at other times (for example, periodically), the system identifies and captures the ink written in the title area as the note title. FIG. 10 shows a process for capturing ink titles. In step 1001, the capturing process starts. In step 1002, it is determined if a title area exists. If no, then the system determines the title through another process in step 1003. These alternative realization processes may include extracting the title from text, contents, and/or structure of the document as shown in step 1004, deriving part of the title from the date and time as shown in step 1005, or further ignoring the title 1006 (using no ink title, but only a textual title).

If a title area was provided in step 1002, then the system determines whether any ink was written into the ink title area in step 1007. If yes, then a bounding shape that surrounds the ink in an ink title area is determined in step 1008. The shape determined in step 1008 surrounds all of the ink partially or wholly in the title area. Next in step 1009, the total area of the ink title area is determined. In step 1010, the intersection between the shape of step 1008 and the available area of step 1009 is determined (for simplicity, this result is referred to as the variable RESULT). In step 1012, the resulting ink RESULT is clipped to the intersection determined in step 1010. Alternatively, ink that extends outside of the area may be retained and shown during a later procedure (for example when someone hovers the stylus or input device over the ink title). The resulting ink data RESULT is stored as a document property in step 1013.

If, in step 1007, there is no ink in the ink title area, then the resulting clipped ink intersection (RESULT) is set to a empty ink title 1011 (or effectively contain no ink as an ink title). Alternatively, instead or in addition to setting the ink title as empty in 1011, the system may automatically promote some other set of ink as the ink title (for example, by locating the other ink and creating a copy of the other ink to put in the title area, and the like) and/or may use another title realization process (shown by dotted line from step 1011 to step 1003).

Next in step 1014, the resulting ink (RESULT) is stored in an ink title cache. Finally, the process ends in step 1015. The ink title cache is optional. It does not need to be used to store and display the ink titles. While it improves handling speed, the ink cache may be omitted. For example, one may eliminate the cache when speed is less important than memory consumption. Alternative implementations of the ink cache are possible and encompassed within the scope of the invention, for example, a separate database or file structure may be used in place of the cache.

Displaying Ink Titles

Figure 11:
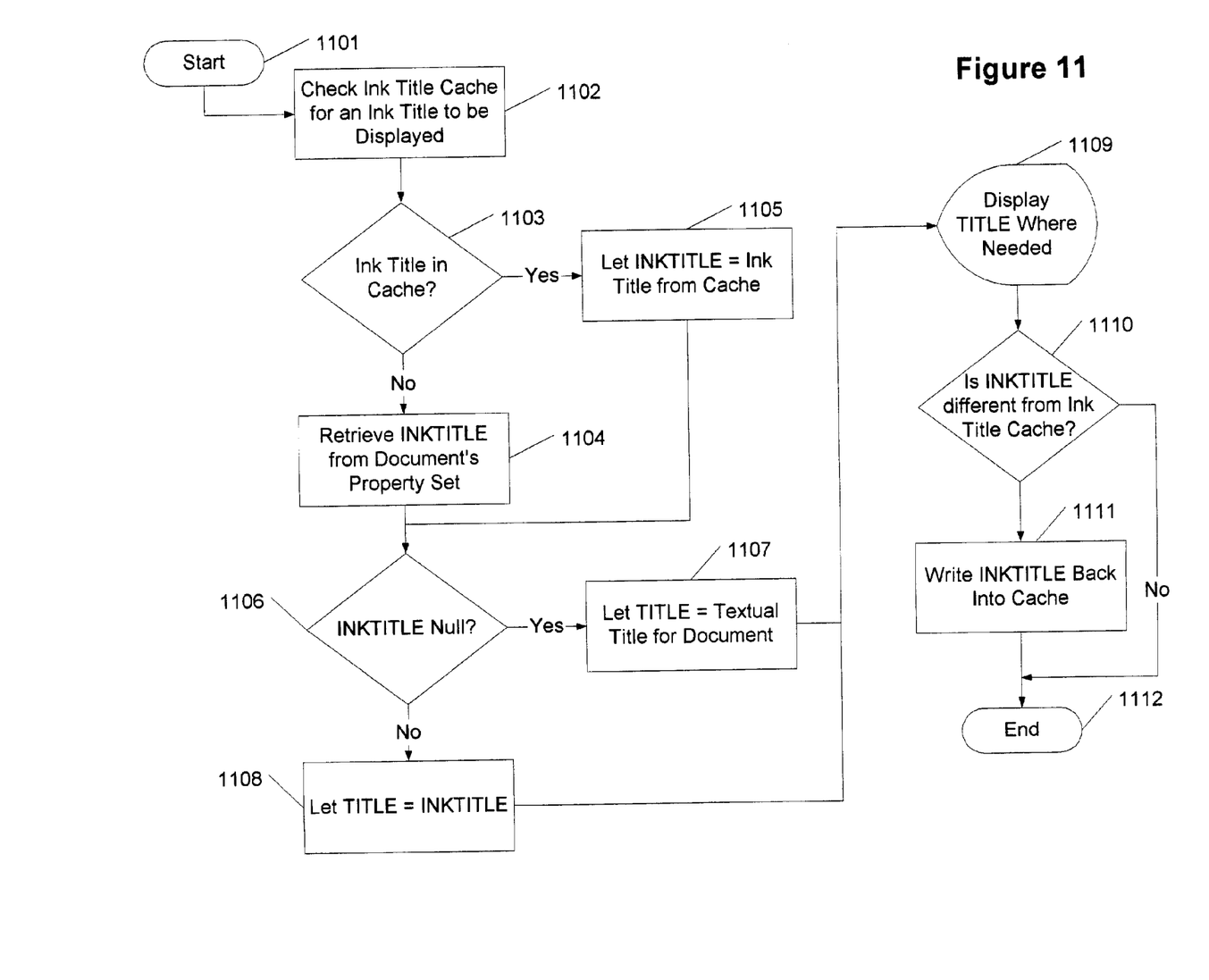
FIG. 11 shows a process for displaying ink titles in accordance with embodiments of the present invention.

FIG. 11 shows a process for displaying ink titles. Two variables are used for explanatory purposes in FIG. 11. The first variable is INKTITLE, which is the ink title associated with a document's properties. The second variable is TITLE, which is the title to be displayed in the display lists of groups 902-905.

In step 1101, the process starts. In step 1102, the system determines whether an ink title to be displayed is stored in an ink title cache. If the cache has an ink title in step 1103, then the variable INKTITLE is set equal to the title from the cache 1105. Otherwise, the system attempts to retrieve a title from the document's property set and set INKTITLE equal to the retrieved title in step 1104. Next in step 1106, the system determines whether INKTITLE has a null value. If yes, then TITLE is set equal to the textual title for the document in step 1107. Otherwise, TITLE is set equal to INKTITLE.

Next, in step 1109, the system displays the variable TITLE where needed. Here, in step 1109, the ink title may be modified by the user. In step 1110, the system determines whether INKTITLE is different from the ink title in the ink title cache. If yes, then INKTITLE is copied back into the cache in step 1111 then ends in step 1112. Otherwise, the system proceeds directly to step 1112.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

The invention claimed is:

1. A system in which displaying an ink title of a note file allows a user to recognize handwriting of a user who input the ink title comprising:

a document editor for receiving ink including a sequence of strokes relating to a note file;

a processor for associating the ink with a title of said note file;

storage for storing said ink as an ink title associated with said note file; and a display for displaying the ink title stored in storage in a file directory listing in response to a user input.

2. The system according to claim 1, wherein said storage is configured to be searched for the ink title.

3. The system according to claim 1, further comprising:

a cache, wherein said cache temporarily holds at least one ink title from said storage.

4. The system according to claim 3, wherein said ink title from said cache is displayable to a user when displaying information about said note file.

5. The system according to claim 1, further comprising:

a file structure, wherein said file structure holds at least one ink title from said storage.

6. The system according to claim 1, further comprising:
a database,
wherein said database holds at least one ink title from said storage.

7. The system according to claim 1, wherein said storage stores said ink title independent of said note file.

8. The system according to claim 1, wherein said storage stores said ink title with said note file as a property of said note file.

9. The system according to claim 1, further comprising:
an ink title region,
wherein ink entered into said ink title region is stored as said ink title.

10. The system according to claim 1, wherein said processor uses a first line of said note file as said ink title.

11. The system according to claim 1, wherein said processor uses linguistic analysis to determine words for inclusion in said ink title.

12. The system according to claim 11, wherein said linguistic analysis includes determining words in a largest print.

13. The system according to claim 11, wherein said linguistic analysis includes determining proper names.

14. A process for displaying an ink title, wherein a user is able to recognize handwriting of a user who input the displayed ink title, comprising the steps of:
receiving ink including a sequence of strokes;
determining if said received ink is in a title area of a note file;
storing said received ink in said title area as an ink title of the note file; and
displaying the stored ink title in a file directory listing in response to a user input.

15. The process according to claim 14, wherein said determining step further comprising the steps of:
determining a bounding box for said ink in said title area;
determining an available area for said title area; and
clipping said ink to an intersection between said bounding box and said title area.

16. The process according to claim 14, further comprising the step of:
storing said ink title as a property of said note file.

17. The process according to claim 14, further comprising the step of:
storing said ink title in a cache.

18. The process according to claim 14, further comprising the step of:
storing said ink title in a database.

19. The process according to claim 14, further comprising the step of:
storing said ink title in a file structure.

20. A process for creating an ink title from an ink note, wherein a user is able to recognize handwriting of a user who input the created ink title, comprising the steps of:
receiving ink including a sequence of strokes as said ink note;
selecting at least some of said ink;
storing said selected ink as said ink title of a note file including said ink note; and
displaying the stored ink title of the note file in a fle directory listing in response to a user input.

21. The process according to claim 20, further comprising:
determining at least one of a date and a time of the creation of said ink note;

storing a representation of said at least one of a date and a time as at least part of said ink title.

22. A process for displaying an ink title, wherein a user is able to recognize handwriting of a user who input the displayed ink title, comprising the steps of:
determining that an ink title of a file is stored in a cache, the ink title including a sequence of strokes; and
displaying said ink title as a title of said file in a file directory listing in response to determining that the ink title of the file is stored in the cache.

23. A process for displaying an ink title, wherein a user is able to recognize handwriting of a user who input the displayed ink title, comprising the steps of:
determining that an ink title of a file is stored in a database, the ink title including a sequence of strokes; and
displaying said ink title as a title of said file in a file directory listing in response to determining that the ink title of the file is stored in the database.

24. A process for displaying an ink title, wherein a user is able to recognize handwriting of a user who input the displayed ink title, comprising the steps of:
determining an ink title of a file is stored in a file structure, the ink title including a sequence of strokes; and
displaying said ink title as a title of said file in a file directory listing in response to determining that the ink title of the file is stored in the file structure.

25. A process for displaying an ink title, wherein a user is able to recognize handwriting of a user who input the displayed ink title, comprising the steps of:
retrieving an ink title including a sequence of strokes from a property set of a file; and
displaying said ink title as a title of said file in a file directory listing.

26. A process for updating a cached version of an ink title of a file comprising the steps of:
determining that an ink title including a sequence of strokes input for a file is different from an ink title including a sequence of strokes stored in a cache for the file;
writing said ink title to said cache in a file directory listing in response to determining that the ink title is different from the ink title stored in said cache for the file; and
displaying the ink title written in cache in a file directory listing in response to a user input.

27. A process for finding notes based on an ink title comprising the steps of:
receiving ink including a sequence of strokes;
searching an ink title of one or more ink notes for said received ink;
displaying search results including an ink title having a sequence of strokes responsive to said searching step.

28. The process for finding notes according to claim 27, wherein said displaying step displays said search results as a list of ink titles.

29. A system for finding notes based on an ink title comprising:
an input for receiving ink including a sequence of strokes;
storage for storing ink titles including sequences of strokes associated with ink notes;
a processor for searching the ink titles in said storage for said received ink;
an output for outputting said search results including an ink title having a sequence of strokes to a display.

30. The system according to claim 29, wherein said output is used to display said search results as a list of ink titles.

31. A user interface comprising a region having a list of ink titles in a file directory listing, each ink title associated with a corresponding file and including a sequence of strokes.

32. The user interface according to claim 31, wherein said list of ink titles is a list of search results.

33. The user interface according to claim 31, wherein said list of ink titles is a list of most recently used files.

34. The user interface according to claim 31, wherein said list of ink titles is a history list of files.

* * * * *